(12) United States Patent
Chattopadhyay et al.

(10) Patent No.: US 8,989,491 B2
(45) Date of Patent: Mar. 24, 2015

(54) METHOD AND SYSTEM FOR PREPROCESSING THE REGION OF VIDEO CONTAINING TEXT

(75) Inventors: Tanushyam Chattopadhyay, Kolkata (IN); Aniruddha Sinha, Kolkata (IN); Arpan Pal, Kolkata (IN)

(73) Assignee: Tata Consultancy Services Limited (IN)

( * ) Notice: Subject to any disclaimer, the term of this patent is extended or adjusted under 35 U.S.C. 154(b) by 494 days.

(21) Appl. No.: 13/395,754

(22) PCT Filed: Dec. 29, 2010

(86) PCT No.: PCT/IN2010/000864
§ 371 (c)(1),
(2), (4) Date: May 29, 2012

(87) PCT Pub. No.: WO2011/080763
PCT Pub. Date: Jul. 7, 2011

(65) Prior Publication Data
US 2012/0242897 A1    Sep. 27, 2012

(30) Foreign Application Priority Data

Dec. 31, 2009   (IN) .......................... 3039/MUM/2009

(51) Int. Cl.
*G06K 9/00*    (2006.01)
*G06K 9/32*    (2006.01)
*G06K 9/34*    (2006.01)

(52) U.S. Cl.
CPC ................ *G06K 9/325* (2013.01); *G06K 9/348* (2013.01)

USPC .......................................... 382/181; 382/176

(58) Field of Classification Search
USPC ......... 382/173, 176, 179, 181, 187, 254, 266, 382/305
See application file for complete search history.

(56) References Cited

U.S. PATENT DOCUMENTS

| | | | |
|---|---|---|---|
| 6,470,094 B1 * | 10/2002 | Lienhart et al. | 382/176 |
| 6,614,930 B1 * | 9/2003 | Agnihotri et al. | 382/176 |
| 6,766,528 B1 | 7/2004 | Kim et al. | |
| 7,339,992 B2 * | 3/2008 | Chang et al. | 375/240.25 |
| 7,961,948 B2 | 6/2011 | Katsuyama | |
| 8,320,674 B2 * | 11/2012 | Guillou et al. | 382/179 |
| 2002/0038344 A1 | 3/2002 | Ullman et al. | |
| 2002/0083464 A1 | 6/2002 | Tomsen et al. | |
| 2002/0188959 A1 | 12/2002 | Piotrowski | |
| 2007/0160295 A1 * | 7/2007 | Wang et al. | 382/199 |
| 2007/0292027 A1 | 12/2007 | Jung et al. | |
| 2007/0292029 A1 | 12/2007 | Wang et al. | |

(Continued)

FOREIGN PATENT DOCUMENTS

| | | |
|---|---|---|
| EP | 1 271 403 B1 | 3/2005 |
| IN | 2236/MUM/2008 A1 | 8/2010 |

OTHER PUBLICATIONS

Chen et al. (GeoTV: navigating geocoded rss to create an IPTV experience) (2007).
Farhi. (Broadband News Aggregator), Apr. 2006.

(Continued)

*Primary Examiner* — Ishrat I Sherali
(74) *Attorney, Agent, or Firm* — Thompson Hine LLP

(57) ABSTRACT

A method and system for preprocessing text containing region of a video The invention provides a method and system for preprocessing the text containing region of video for improving the optical character recognition input.

19 Claims, 6 Drawing Sheets

(56) References Cited

U.S. PATENT DOCUMENTS

Figure 1:
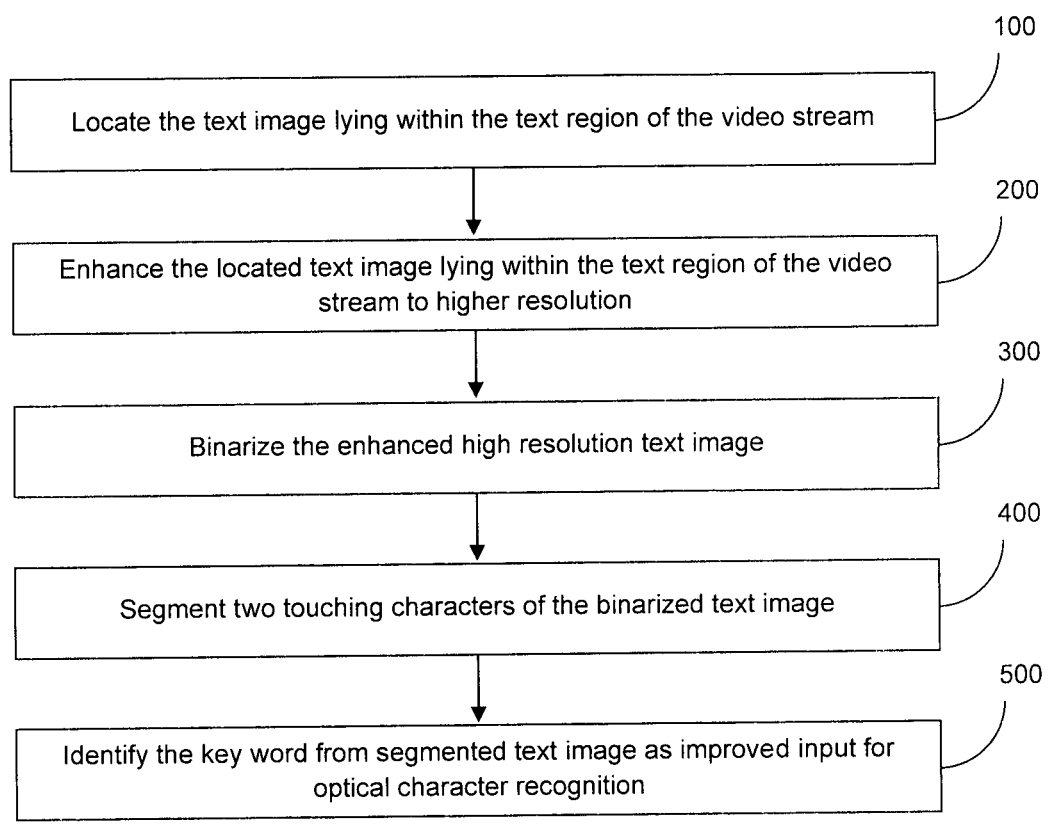

2008/0187225 A1 8/2008 Katsuyama
2009/0019482 A1 1/2009 Kim et al.

OTHER PUBLICATIONS

Chattopadhyay, T. (Recognition of trademarks from sports videos for channel hyper linking in consumer end) (2009).
Kopf S et al: Reihe Informatik TR-05-002. (Robust Character Recognition in Low-Resolution Images and Videos) (2005).
Sato T et al: (Video OCR: Indexing Digital News Libraries by Recognition of Superimposed Captions) (Sep. 1, 1999).
Sato T et al: (Video OCR for Digital News Archives) (1998).
Nomura et al: (A Novel adaptive morphological approach for degraded character image segmentation) (Nov. 1, 2005).
Arpan Pal, Aniruddha Sinha and Tanushyam Chattopadhyay: (Recognition of Characters from Streaming Videos) (Aug. 2010).
International Search Report, International Application No. PCT/IN2010/000864 (mailed May 30, 2011; published Jul. 7, 2011).

* cited by examiner

METHOD AND SYSTEM FOR PREPROCESSING THE REGION OF VIDEO CONTAINING TEXT

FIELD OF THE INVENTION

The present invention relates to the field of broadcasting. Particularly, the invention relates to a method and system for preprocessing the region of video containing text. More particularly, the invention relates to a method and system for preprocessing the region of video containing text for improving the input for optical character recognition.

BACKGROUND OF THE INVENTION

Recent years have experienced major increase in the dynamic dissemination of information using devices such as television, computer etc. Such devices are increasingly being used to get latest information related to various fields. The information dissemination through these devices is in the form of video, audio, text or a combination thereof. A news broadcast is the best example of the information dissemination in the form of video, audio, text and combinations thereof.

In the current scenario, a subscriber has the access to only the information which is being communicated. In order to get further related information to a particular subject or the area of interest, a user has to use some other information sources such as internet. User has to conduct the manual searches to obtain the related information to his the area of interest other than the information being communicated by the information dissemination device e.g. television.

In order to obtain the user required information related to his the area of interest other than the information being displayed on the information dissemination device; there is a need to have an automated system that uses the existing the region of video containing text for improving the performance of optical character recognition and for subsequent searching. Thus region of video containing text should be efficient determined for improving the performance of optical character recognition and for subsequent searching using the said text.

Some of the existing method and systems that are capable of conducting text based searching but are not efficient enough to efficiently determine the region of video containing text for improving the performance of optical character recognition and for subsequent searching known to us are as follows:

U.S. Pat. No. 6,766,528 to Kim et al. provides an apparatus and method for displaying additional information on a TV program. It teaches a method for obtaining information from an external source such as the Internet and further display to a user, if requested.

US20020083464 to Tomsen, et al. provides context-sensitive request for searching supplemental content related to a television broadcast being displayed by an interactive television system. The patent doesn't teach about the preprocessing the region of video containing text for improving the performance of optical character recognition and for subsequent searching for the related information using the preprocessed region of video containing text.

US20090019482 to Kim, et al. provides an image display apparatus and information providing method using the image display apparatus. The patent discusses about the image display apparatus such as a digital TV classifies RSS information, which is provided from a web server, according to the time slot and displays the RSS information in predetermined categories at corresponding time slots.

US20020038344 to Ullman, et al. provides a system for integrating video programming with the vast information resources of the Internet. Ullman, et al. teaches about a computer-based system which receives a video program with embedded uniform resource locators (URLs).

US2002188959 to Piotrowski provides a system and method that allow viewers of video/TV programs to automatically, or by request, receive synchronized supplemental multimedia information related to the video/TV programs. The problem addressed particularly relates to the supplemental multimedia information which is received as an. Internet document, e.g., using Synchronized Multimedia Integration Language (SMIL). Synchronizing information is received/extracted from the video/TV program. Further it concerned with displaying the video/TV program and the supplemental multimedia information as a virtual web page.

Chen et al. in "GeoTV: navigating geocoded rss to create an IPTV experience" teaches about the GeoTV, where a framework by which web content can be presented or pushed in a meaningful manner to create an entertainment experience for the TV audience.

Farhi in "Broadband News Aggregator" teaches about a broadband iTV application that delivers news from multiple sources.

In our own previous patent 2236/MUM/2008 and publication "Recognition of trademarks from sports videos for channel hyper linking in consumer end" a system to automatically recognize the Trademarks from sports video for channel hyper linking was disclosed. The text regions are localized using some characteristic of text and the trademarks are recognized by comparing with the shape invariant features and color features from the restricted trademark database.

The above mentioned prior arts fail to disclose an efficient method and system that can preprocess the region of video containing text for improving the performance of optical character recognition and subsequent searching for the related information using the preprocessed region of video containing text. Thus, in the light of the above mentioned background art, it is evident that, there is a need for a solution that can provide a method and system for accurately preprocessing the region of video containing text for improving the performance of optical character recognition and subsequent searching for the related information using the using the output preprocessed region of video containing text.

OBJECTS OF THE INVENTION

In accordance with the present invention, the primary objective is to provide a method and system for preprocessing the region of video containing text for improving the performance of optical character recognition.

Another objective of the invention is to provide a method and system for preprocessing the region of video containing text for subsequent searching, retrieving and further displaying the information related to the text embedded in a video stream.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present invention provides a method and system for preprocessing the region of video containing text for improving the performance of optical character recognition.

In one aspect of the invention a method and system is provided for preprocessing the region of video containing text for improving the performance of optical character recognition and subsequent searching, retrieving and further displaying the information related to the text embedded in a video stream.

In another aspect of the invention the regions containing the text embedded in a video stream may be identified automatically or manually by the user.

The above said method and system are preferably for preprocessing the text embedded in a video stream that can be used as input for several applications.

BRIEF DESCRIPTION OF THE ACCOMPANYING DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings:

FIG. 1 Flow diagram showing preprocessing of the region of video containing text for improving the performance of optical character recognition.

Figure 2:
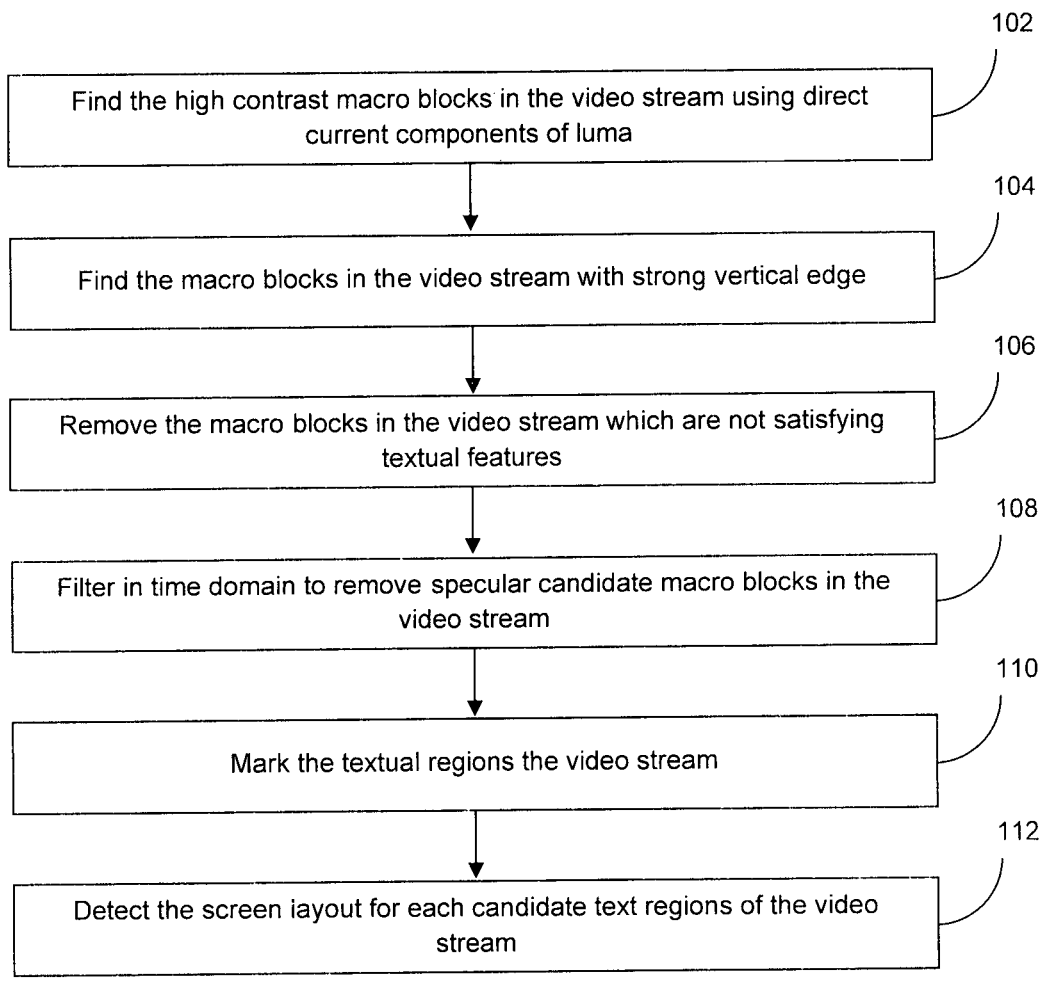

FIG. 2 Conventional/prior-art flow diagram showing localization of the text image in the region of video containing text.

Figure 3:
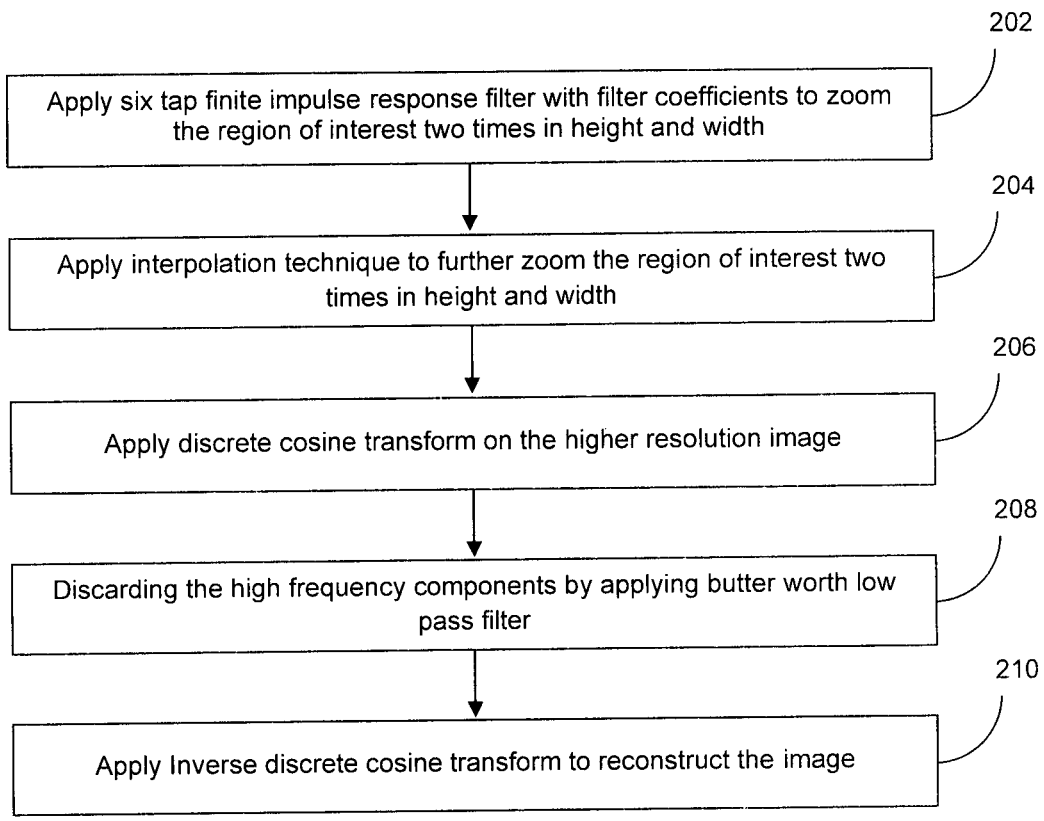

FIG. 3 Flow diagram showing enhancement of the localized text image in the region of video containing text to higher resolution.

Figure 4:
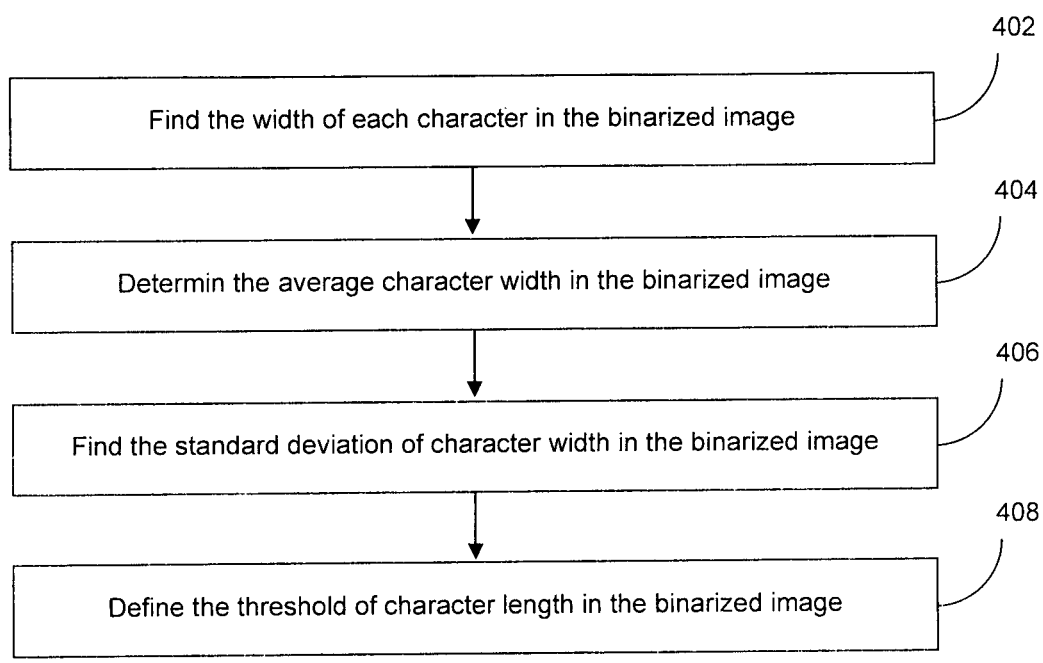

FIG. 4 Flow diagram showing segmentation of the at least two touching characters of the binarized text image.

Figure 5:
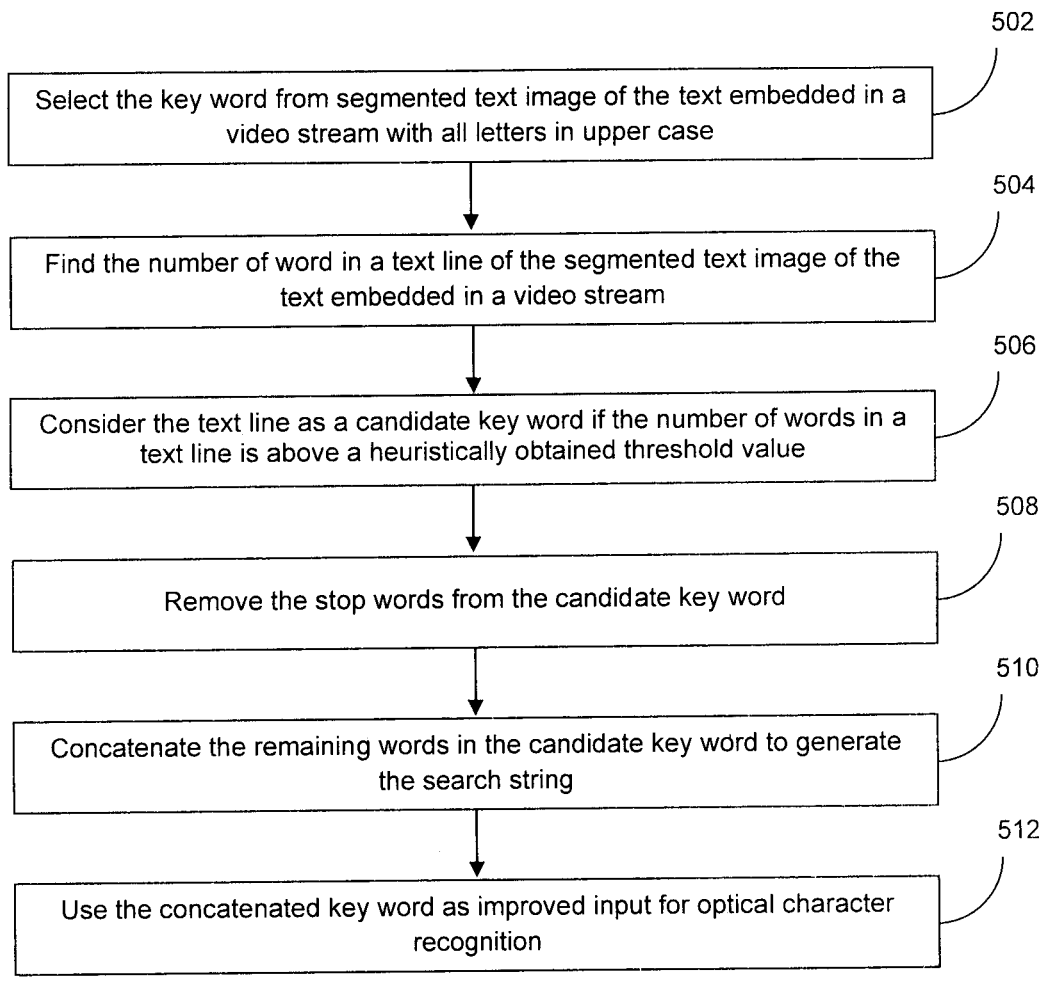

FIG. 5 Flow diagram showing identification of the key word from segmented text image as improved input for optical character recognition.

Figure 6:
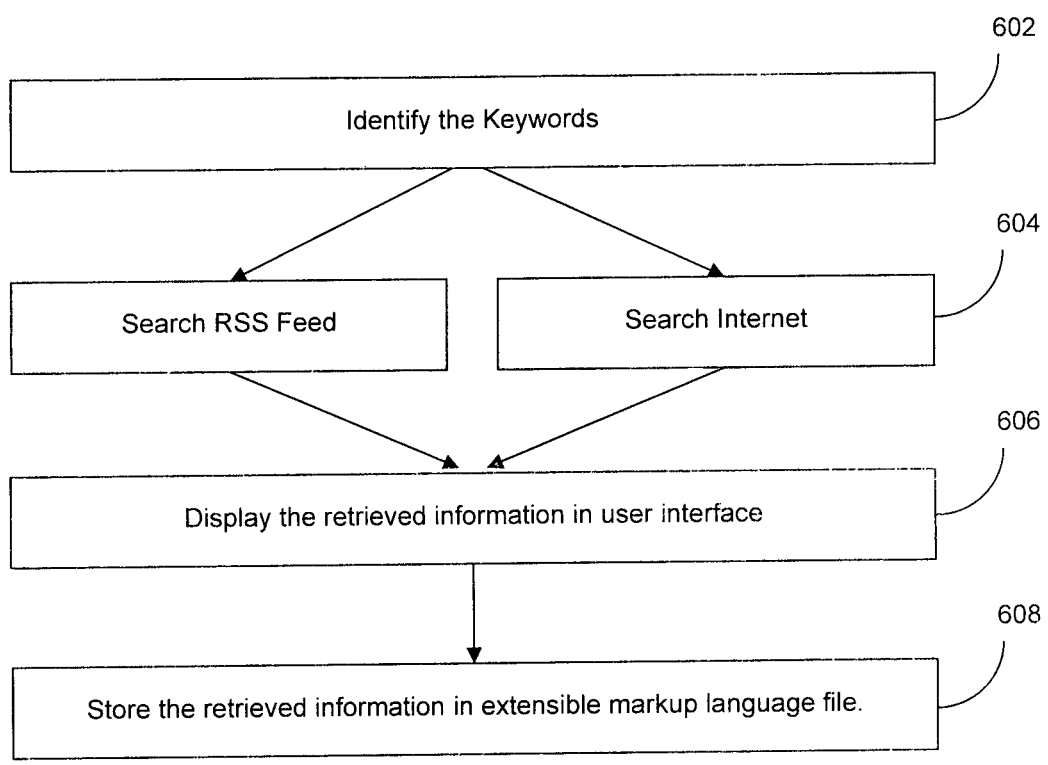

FIG. 6 Flow diagram showing searching the identified key word for subsequent displaying and storing the retrieved information.

DETAIL DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The present invention enables a method and system for preprocessing the region of video containing text for improving the performance of optical character recognition. In one embodiment of the invention the output text can be used for subsequent searching using the preprocessed region of video containing text as input for retrieving the further information related to such text and displaying the retrieved searched information related to the text.

The present invention provides a method for preprocessing the text containing region of video for improving the optical character recognition input, wherein the said region of video containing text is preprocessed by the computer implemented steps of:
  a. locating the text image in the region of video containing text;
  b. enhancing the recognized text image in the region of video containing text to higher resolution;
  c. binarizing the enhanced high resolution text image;
  d. segmenting the at least two touching characters of the binarized text image, and
  e. identifying the keyword from segmented text image as improved input for optical character recognition.

The present invention also proposes, a system for preprocessing the text containing region of video for improving the optical character recognition input, wherein the said system comprises:
  a. at least one image processing device enabling location of the text image, enhancing the located text image to higher resolution followed by binarization, segmenting the at least two touching characters of the binarized text image, and further identifying the keyword from segmented text image as improved input for OCR; and
  b. at least one optical character recognition device, for recognizing the preprocessed text input; and
  c. at least one digital storage device and memory element communicatively coupled with each other for storing preprocessed region of video containing text.

Referring to FIG. 1 is a flow diagram showing preprocessing of the region of video containing text for improving the performance of optical character recognition.

The process starts at the step 100, the text image in the region of video containing text is located. At the step 200, the located text image in the region of video containing text is enhanced to higher resolution by using image processing device. At the step 300, the enhanced high resolution text image is binarized by using image processing device. At the step 400, at least two touching characters of the binarized text image are segmented by using image processing device. The process ends at the step 500, the key word from segmented text image is identified as improved input for optical character recognition. The region of video containing text is preprocessed for improving the optical character recognition input and subsequent searching, retrieving and displaying additional information related to the region of video containing text.

Referring to FIG. 2 is a conventional/prior-art flow diagram showing localization of the text image in the region of video containing text. Wherein, the text image in the region of video containing text is localized by using optical character recognition device.

The process starts at the step 102, the high contrast macro blocks in the video stream are found using direct current components of luma. At the step 104, the macro blocks in the video stream with strong vertical edge are found. At the step 106, the macro blocks in the video stream are removed which are not satisfying textual features. At the step 108, time domains are filtered in to remove specular candidate macro blocks in the video stream. At the step 110, the textual regions the video stream are marked. The process ends at the step 112, the screen layout for each candidate text regions is detected for localizing the text image in the region of video containing text.

Referring to FIG. 3 is a flow diagram showing enhancement of the localized text image in the region of video containing text to higher resolution.

In another embodiment of the invention, the localized text image in the region of video containing text is enhanced to higher resolution by using image processing device.

The process starts at the step 202, six tap finite impulse response filter is applied with filter coefficients to zoom the region of interest two times in height and width. Wherein the filter coefficients are 1, −5, 20, 20, −5,1. At the step 204, interpolation technique is applied to further zoom the region of interest two times in height and width. At the step 206, discrete cosine transform is applied on the higher resolution image. At the step 208, the high frequency components are discarded by applying butter worth low pass filter. The process ends at the step 210, inverse discrete cosine transform is applied to reconstruct the image in higher resolution.

In another embodiment of the invention, the enhanced high resolution text image is binarized by using image processing device. The recognized text image in the region of video containing text is enhanced to higher resolution by using image processing device and the output is then binarized using an adaptive thresholding algorithm. There may be several ways to achieve binarization so that the foreground and the background of the text image can be separated. However, as both the characters present in the relevant text region as well as the background are not of a fixed gray level value, adaptive thresholding is used in this approach for binarization. To obtain the threshold image, Otsu's method is used in this solution.

Referring to FIG. 4 is a flow diagram showing segmentation of the at least two touching characters of the binarized text image.

In another embodiment of the invention, at least two touching characters of the binarized text image are segmented. The touching character segmentation is done by using image processing device.

The enhanced high resolution text image is binarized by using image processing device. The output in the form of binarized image is used for touching character segmentation. Once the binarized image is obtained very frequently, it is observed that the image consists of a number of touching characters. These touching characters degrade the accuracy rate of the any optical character recognition devices. Hence the touching character segmentation is required to improve the performance of the optical character recognition.

The process starts at the step 402, the width of each character in the binarized image is calculated. It is assumed that each connected component with a significant width is a character. Let the character width for the $i^{th}$ component be $WC_i$. At the step 404, the average character width in the binarized image is determined. The average character width is calculated by using $$\mu_{WC} = \frac{1}{n}\sum_{i=1}^{n} WC_i$$

where, n is the number of character in the region of interest. At the step 406, the standard deviation of character width in the binarized image is calculated. The standard deviation of character width ($\sigma_{WC}$) is calculated as $\sigma_{WC}=STDEV(WC_i)$. The process ends at the step 408, the threshold of character length in the binarized image is defined. The threshold of Character Length ($T_{WC}$) as $T_{WC}=\mu_{WC}+3\sigma_{WC}$. If $WC_i>T_{WC}$ mark the $i^{th}$ character as candidate touching character. The number of touches in $i^{th}$ candidate component is computed as $$n_i = \left\lceil \frac{WC_i}{T_{WC}} \right\rceil + 1$$

Divide $WC_i$ in $n_i$ equally spaced segments.

Referring to FIG. 5 is a flow diagram showing identification of the key word from segmented text image as improved input for optical character recognition.

In yet another embodiment of the invention, the key word from segmented text image is identified as improved input for optical character recognition and for searching, retrieving and displaying additional information related to the region of video containing text by using image processing device.

The process starts at the step 502, the key word from segmented text image of the text embedded in a video stream is selected with all letters in upper case. At the step 504, the number of word in a text line of the segmented text image of the text embedded in a video stream is calculated. At the step 506, the text line is considered as a candidate key word if the number of words in a text line is above a heuristically obtained threshold value. At the step 508, the stop words from the candidate key word are removed. At the step 510, the remaining words in the candidate key word are concatenated to generate the search string. The process ends at the step 512, the concatenated key word is used as improved input for optical character recognition and the search string for searching, subsequent retrieving and displaying additional information related to the text embedded in a video stream.

Referring to FIG. 6 is a flow diagram showing searching the identified key word for subsequent displaying and storing the retrieved information.

In still another embodiment of the invention, the key word from segmented text image is searched for subsequent retrieving and displaying additional information related to the text embedded in a video stream.

The process starts at the step 602, the Keyword is identified. At the step 604, the identified key word is searched in RSS feed or on the internet. At the step 606, the retrieved information is displayed on the user interface. The process ends at the step 608, the retrieved information is stored in extensible markup language file.

The preceding description has been presented with reference to various embodiments of the invention. Persons skilled in the art and technology to which this invention pertains will appreciate that alterations and changes in the described process and methods of operation can be practiced without meaningfully departing from the principle, spirit and scope of this invention

BEST MODE/EXAMPLE OF WORKING OF THE INVENTION

The invention is described in the example given below which is provided only to illustrate the invention and therefore should not be construed to limit the scope of the invention.

In an example a method and system is provided for preprocessing the region of video containing text in connected television can locate the breaking news or ticker news from the news video shown on the television for improving the optical character recognition input. The said method and system provides subsequent searching, retrieving information related to the region of video containing text from internet or RSS feeds and further display the information related to the text embedded in a video stream on the television for user.

The method and system analyze the news videos syntactically and generate search query. Further, the method and system utilizes search engine like google for searching the generated search query. The keyword identification for searching is based on heuristics which are in turn is based on some observations like, breaking news are always comes in capital letter, font size of those important news are larger than that of the ticker text, they appear on either just above or just bellow the central region, where the anchor, studio or some news clippings are shown.

The above said observations leads to the following approach to identify the keywords as selecting the recognized words coming from the output of optical character recognition with all letters in upper case, finding the number of words in a text line. If the number of words in a text line is above a heuristically obtained threshold value are considered as candidate text region. If multiple such text lines are obtained, the approach find out whether there is any such text line above the middle of the video frame. If multiple such text lines are obtained below the middle of the video frame select the text line which is nearer to the middle of the video frame is considered as the candidate text. The method and system uses this text line as the input to search the RSS feeds. At the next step, the stop words like a, an, the, for, of etc. are removed from candidate text. Concatenation of the remaining words is done to generate the search string for internet search engine or RSS feed. The information searched on the internet or RSS feed related to the breaking or ticker news is retrieved and displayed for the user on the television.

According to the method and system provided the localization of the text regions from the video may work with minimum errors, though it may have some false positives. But those are taken care by the data semantic analysis. The output of the optical character recognition may also not accurate but while searching the related information from RSS feed using longest common subsequence matching and leveinsthein distance these errors are not impacting in getting the desired result.

We claim:

1. A method for preprocessing a text containing region of video for improving the optical character recognition input, characterized by preprocessing a plurality of frames of said text containing region of video, said method comprises computer implemented steps of:
   a. locating the text image in the region of video containing text in the plurality of frames of said text containing region of video;
   b. enhancing the recognized text image in the region of video containing text to higher resolution by applying a combination of a six tap finite impulse response filter and an interpolation technique;
   c. binarizing the enhanced high resolution text image;
   d. segmenting at least two touching characters of the binarized text image by finding standard deviation of each character's width with average character width in the binarized image, and
   e. identifying the keyword from segmented text image as improved input for optical character recognition.

2. The method as claimed in claim 1, wherein said text in the region of video containing text is located by the computer implemented steps of:
   a. finding the high contrast macro blocks in the region of video containing text using direct current components of luma;
   b. finding the macro blocks in the region of video containing text with strong vertical edge;
   c. removing the macro blocks in the region of video containing text which are not satisfying textual features;
   d. filtering in time domain to remove specular candidate macro blocks in the region of video containing text;
   e. marking the textual regions in the region of video containing text; and
   f. detecting the screen layout for each candidate text regions for recognizing the text image in the region of video containing text.

3. The method as claimed in claim 1, wherein the located text image in the region of video containing text is enhanced further to higher resolution by the computer implemented steps of:
   a. applying six tap finite impulse response filter with filter coefficients to zoom the region of interest two times in height and width;
   b. applying interpolation technique to further zoom the region of interest two times in height and width;
   c. applying discrete cosine transform on the higher resolution image;
   d. discarding the high frequency components by applying butter worth low pass filter, and
   e. applying Inverse discrete cosine transform to reconstruct the image in higher resolution.

4. The method as claimed in claim 1, wherein the enhanced high resolution text image is binarized by an adaptive thresholding for separation of the foreground and the background of the text image.

5. The method as claimed in claim 1, wherein the at least two touching characters of the binarized image is segmented by the computer implemented steps of:
   a. finding the width of each character in the binarized image;
   b. determining the average character width in the binarized image;
   c. finding the standard deviation of character width in the binarized image, and
   d. defining the threshold of character length in the binarized image.

6. The method as claimed in claim 1, wherein the keywords from segmented text image is identified by the computer implemented steps of:
   a. selecting the keywords from segmented text image of the region of video containing text with all letters in upper case;
   b. finding the number of word in a text line of the segmented text image of the region of video containing text;
   c. considering the text line as a candidate keyword if the number of words in a text line is above a heuristically obtained threshold value;
   d. removing the stop words from the candidate keyword;
   e. concatenating the remaining words in the candidate keyword to generate the search string;
   f. using the concatenated keyword as the search string for improving the performance of optical character recognition.

7. The method as claimed in claim 6, wherein the stop words are selected from the group consisting of like a, an, the, for, or, of.

8. The method as claimed in claim 1, wherein the keywords from segmented text image are used as search query for searching, retrieving and displaying additional information related to the text embedded in a video stream.

9. The method as claimed in claim 1, wherein the preprocessed region of video containing text is further used for searching the additional information related to said text on the internet or RSS feeds containing related information.

10. The method as claimed in claim 9, wherein the searched additional information related to said preprocessed region of video containing text is displayed on the user interface.

11. The method as claimed in claim 10, wherein the searched and displayed additional information related to said preprocessed region of video containing text is stored in an extensible markup language file.

12. The method as claimed in claim 8, wherein processed, searched, retrieved and displayed additional information related to the region of video containing text is about the news while watching television.

13. The method as claimed in claim 12, wherein said news is selected from the group comprising of breaking news and ticker news.

14. A system for preprocessing a text containing region of video for improving the optical character recognition input, wherein said system comprises:
  a. at least one image processing device enabling location of the text image, enhancing the located text image to higher resolution followed by binarization, segmenting the at least two touching characters of the binarized text image, and further identifying the keyword from segmented text image as improved input for OCR; and
  b. at least one optical character recognition device, for recognizing the preprocessed text input; and
  c. at least one digital storage device and memory element communicatively coupled with each other for storing preprocessed region of video containing text.

15. The system as claimed in claim 14, wherein the enhanced high resolution text image is binarized by an adaptive thresholding for separation of the foreground and the background of the text image using the image processing device.

16. The system as claimed in claim 14, wherein the keywords from segmented text image are used as search query for searching, retrieving and displaying additional information related to the text embedded in a video stream.

17. The system as claimed in claim 14, wherein the preprocessed region of video containing text is further used for searching the additional information related to said text on the internet or RSS feeds containing related information.

18. The system as claimed in claim 17, wherein the searched additional information related to said preprocessed region of video containing text is displayed on the user interface.

19. The system as claimed in claim 18, wherein the searched and displayed additional information related to said preprocessed region of video containing text is stored in the form of extensible markup language file on the digital storage device.

* * * * *